US011286141B2

(12) United States Patent
Iotti

(10) Patent No.: US 11,286,141 B2
(45) Date of Patent: Mar. 29, 2022

(54) ARTICULATED SELF-PROPELLED WORK MACHINE

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 236 days.

(21) Appl. No.: 16/366,592

(22) Filed: Mar. 27, 2019

(65) Prior Publication Data
US 2019/0300346 A1 Oct. 3, 2019

(30) Foreign Application Priority Data

Mar. 30, 2018 (IT) .................... 102018000004135

(51) Int. Cl.
| B66F 9/065 | (2006.01) |
| B66F 9/22 | (2006.01) |
| E02F 9/08 | (2006.01) |
| B66F 9/075 | (2006.01) |
| B60W 30/04 | (2006.01) |
| B62D 12/00 | (2006.01) |

(52) U.S. Cl.
CPC ........... B66F 9/0655 (2013.01); B60W 30/04 (2013.01); B62D 12/00 (2013.01); B66F 9/07568 (2013.01); B66F 9/22 (2013.01); E02F 9/0858 (2013.01)

(58) Field of Classification Search
CPC .......... B66F 9/0655; B66F 9/22; E02F 9/0858
See application file for complete search history.

(56) References Cited

U.S. PATENT DOCUMENTS

| 4,006,347 A | 2/1977 | Hohmann |
| 4,042,135 A | 8/1977 | Pugh et al. |
| 4,382,743 A | 5/1983 | Newell |
| 4,822,237 A | 4/1989 | Meyer et al. |
| 5,058,752 A | 10/1991 | Wacht |
| 5,119,949 A | 6/1992 | Kishi |
| 5,147,172 A | 9/1992 | Hosseini |
| 5,224,815 A | 7/1993 | Abels et al. |
| 5,890,870 A | 4/1999 | Berger et al. |
| 8,965,637 B2 | 2/2015 | Brooks et al. |
| 2002/0075157 A1* | 6/2002 | Muller ...................... E02F 9/24 340/679 |

(Continued)

FOREIGN PATENT DOCUMENTS

| DE | 19645651 | 6/1998 |
| DE | 10115312 | 10/2002 |

(Continued)

Primary Examiner — Genna M Mott
(74) Attorney, Agent, or Firm — Pearne & Gordon LLP

(57) ABSTRACT

The articulated self-propelled work machine (1), such as, for example, an articulated telescopic handler or the like, comprises: a front frame (11), provided with a pair of front wheels (111); a lift arm (2), adapted to support a load, hinged to the front frame (11) and mobile with respect thereto by means of at least one actuator (21, 22); a rear frame (12), provided with a pair of rear wheels (121) and articulated to the front frame (11); detecting means (51, 53, 54) for detecting an angular parameter relative to a steering angle between the front frame (11) and the rear frame (12); and electronic processing means (6) configured to control the operation of the actuator (21, 22) on the basis of the angular parameter.

30 Claims, 5 Drawing Sheets

(56) References Cited

U.S. PATENT DOCUMENTS

| | | | |
|---|---|---|---|
| 2003/0168421 A1* | 9/2003 | Davis | E02F 9/085 |
| | | | 212/302 |
| 2004/0200644 A1 | 10/2004 | Paine et al. | |
| 2008/0263909 A1 | 10/2008 | Schoenmaker et al. | |
| 2016/0236922 A1* | 8/2016 | Merlo | B66F 17/003 |
| 2018/0087242 A1 | 3/2018 | Mitchell et al. | |
| 2018/0105205 A1* | 4/2018 | Takenaka | B62D 6/02 |
| 2019/0039868 A1* | 2/2019 | Puszkiewicz | B66F 9/07513 |
| 2020/0141088 A1* | 5/2020 | Myers | E02F 3/431 |

FOREIGN PATENT DOCUMENTS

| | | | | |
|---|---|---|---|---|
| DE | 102016106459 | | 10/2017 | |
| EP | 0059901 | | 9/1982 | |
| EP | 0466046 | A1 | 1/1992 | |
| EP | 0934448 | | 8/1999 | |
| EP | 2520536 | B1 * | 6/2014 | B66F 17/00 |
| EP | 3296249 | | 3/2018 | |
| FR | 2184108 | | 12/1973 | |
| FR | 2287413 | | 5/1976 | |
| GB | 843024 | | 8/1960 | |
| GB | 930904 | | 7/1963 | |
| GB | 1361832 | | 7/1974 | |
| GB | 1403046 | | 8/1975 | |
| GB | 2187432 | | 9/1987 | |
| JP | S61221099 | | 10/1986 | |
| JP | H045491 | | 1/1992 | |
| JP | 3252006 | | 9/1994 | |
| JP | H06263394 | | 9/1994 | |
| JP | 2002128496 | A | 5/2002 | |
| JP | 4741834 | | 6/2006 | |
| JP | 2006168871 | A | 6/2006 | |

* cited by examiner

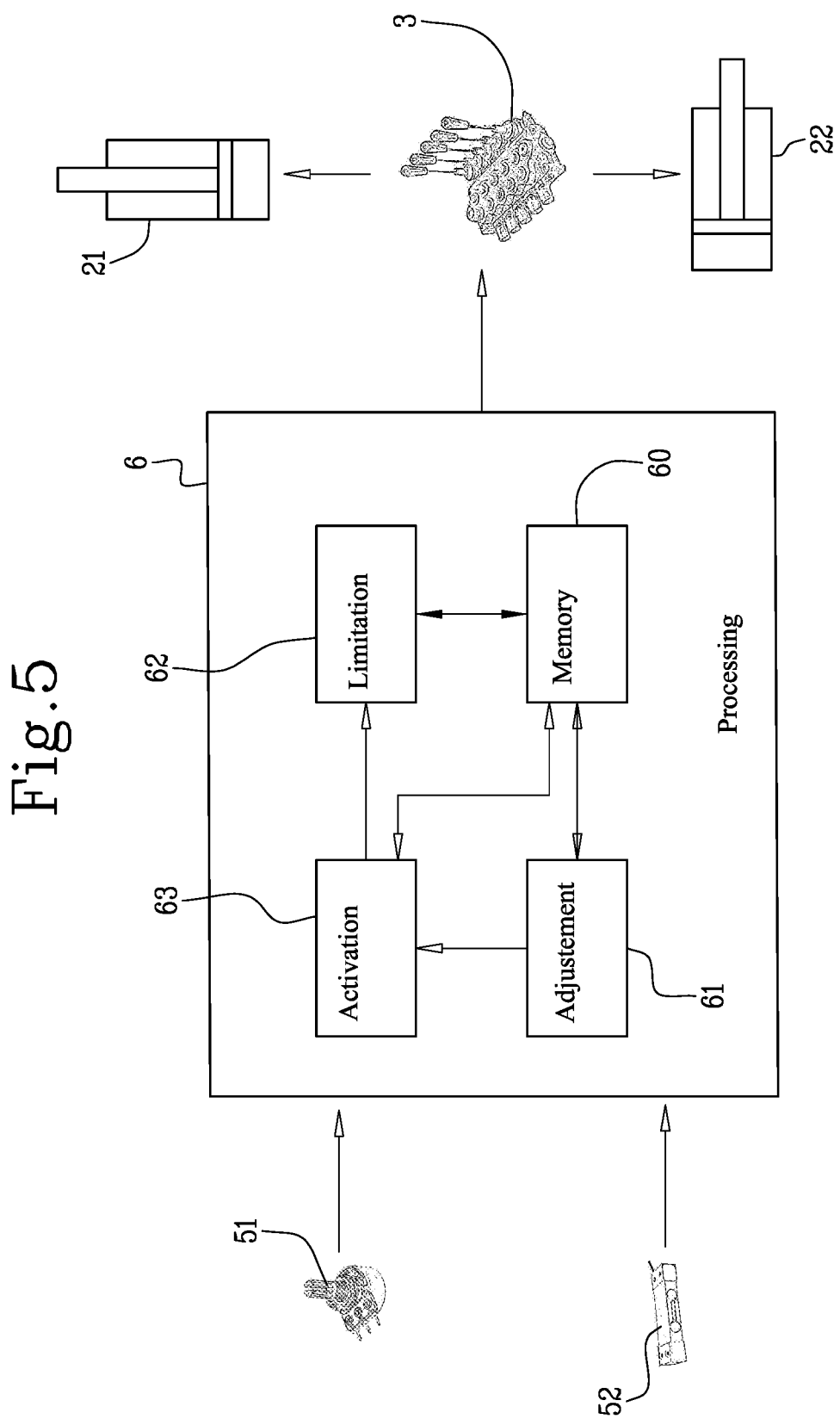

ARTICULATED SELF-PROPELLED WORK MACHINE

The present invention relates to an articulated self-propelled work machine, especially, but not exclusively, an articulated telehandler.

Articulated telescopic handlers (or "telehandlers"), used in various sectors, from the building industry to agriculture, are well known.

For safety reasons, the descent of the lift arm of these machines is always slowed, that is, the velocity of its descent is limited a priori to a value that is significantly lower than those allowed for raising it, in order to avoid the occurrence of lateral instability which might cause the vehicle to tip over.

In fact, in the event that the vehicle is in a condition in which the front frame supporting the lift arm and the rear one bearing the cab and the engine are at an angle, i.e. the respective axes are oblique and the arm is being lowered, carrying on its respective attachment a non-negligible load, if the velocity of the arm were not limited, the vehicle could tip over on its side.

Furthermore, again to prevent the occurrence of a condition of instability, the arm is manoeuvred applying a "conservative" load diagram, i.e. always set assuming an operating condition in which the two frames are at a large angle with each other.

Operators who manoeuvre this type of machinery have noted several disadvantages in the use of the above-described measures against lateral instability, which emerge above all in the agricultural sector.

In fact, in the agricultural sector, articulated telehandlers are typically employed in activities which, individually, take a short time to carry out and, furthermore, take place in many different areas, thus causing the machine to be moved very often; one need only think, for example, of the handling of numerous bales of hay distributed in different areas of a large field of a farm.

Since the limitation on the descent velocity is triggered even when the arm descends "loadless", i.e. there is no load applied on the attachment, and even when the vehicle is "on an axis", i.e. the front and rear frames thereof are aligned, and it therefore cannot tip over on one side, and since the load diagram adopted is always considerably limiting, irrespective of the operating conditions, it may be understood that during activities such as the agricultural ones described above, the current technology for preventing lateral instability constitutes a constraint on the rapidity and ease of work, which not only precludes improving production efficiency, but also constitutes a source of frustration for the operator.

The technical task at the basis of the present invention is thus to propose an articulated self-propelled work machine capable of overcoming the limits of the prior art.

This task is achieved by using the machine constructed in accordance with claim 1, the method implemented in accordance with claim 25 and the computer program according to claim 29.

Additional features and advantages of the present invention will become more apparent from the approximate, and thus non-limiting, description of a preferred but non-exclusive embodiment of an articulated machine according to the invention, as illustrated in the appended drawings, in which:

FIG. 5 is a schematic representation of an electronic processing unit of the machine.

Figure 1:
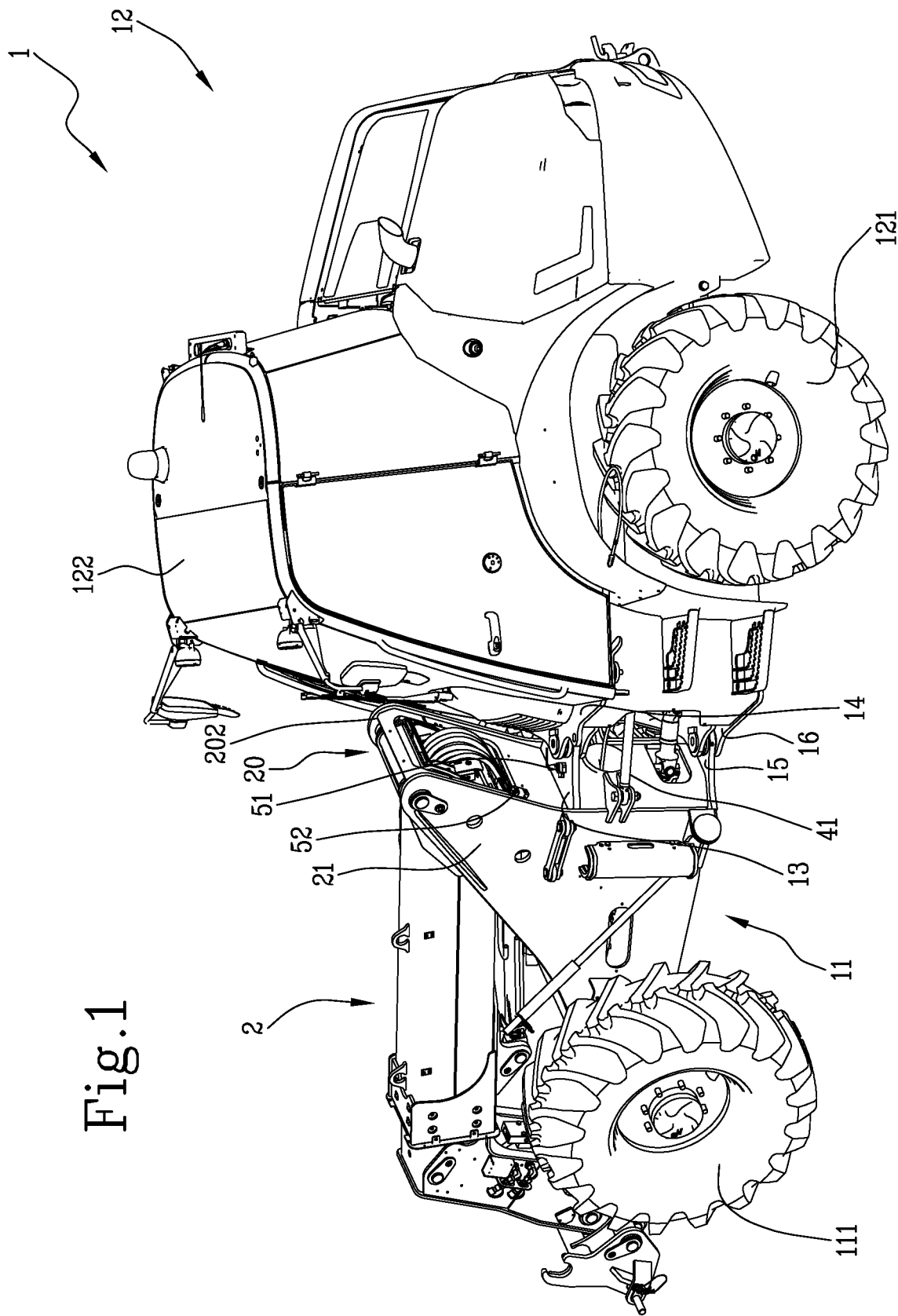
FIG. 1 represents an axonometric view of a machine of the invention, according to a first particular embodiment.

With reference to the appended figures, the articulated self-propelled work machine according to the invention is indicated by 1.

The articulated machine proposed is preferably a telescopic handler 1, also known in the sector as a telehandler; therefore, hereinafter, for the sake of simplicity of disclosure, we shall make reference to the non-limiting example case in which the machine 1 is an articulated telehandler.

The telehandler 1 of the invention includes a front frame 11, provided with a pair of front wheels 111, preferably drive wheels, and a rear frame 12, articulated to the front frame 11 and provided with a pair of rear wheels 121, preferably drive wheels.

The rear frame 12 has the driver's cab 122 and the engine mounted on it, whilst the telescopic lift arm 2 is hinge-mounted on the front frame 11 and the electro-hydraulic distributor 3, which controls the various hydraulic actuators 21, 22 of the invention, can also be positioned there.

The invention can clearly also be extended to cases in which, in the place of the wheels 111, 121, there are tracks or other means of engagement with the ground.

The arm 2 is hinged to the front frame 11 at its proximal end, whilst at its distal end it is provided with a coupling to which a work attachment adapted to support a load, for example a fork, can be removably coupled.

For the purpose of moving the arm 2, there are provided various hydraulic actuators 21, 22, represented in a stylised manner in FIG. 5, which are subjected to the distributor 3, in particular for raising and lowering the arm 2, extending and shortening the arm 2 and possibly for the functions of the attachment.

More precisely, a first actuator 21 is provided for pivoting the arm 2 about the hinge of the front frame 11, that is, for lowering and lifting; it can be, for example, a hydraulic cylinder 21.

Furthermore, within the segments slidingly inserted into one another and which define the telescopic arm 2, there is provided at least a second extension/retraction actuator 22, connected to the segments themselves, which is preferably a hydraulic cylinder 22.

In any case, the method of connection between the cylinders 21, 22 and the arm 2 and the actuation thereof can also be of a known type, i.e. like the ones implemented in the known articulated telehandlers.

It should be noted, moreover, that if the telehandler 1 is fitted with an attachment pivotable about an axis perpendicular to the arm 2, there can be provided a compensation cylinder, in itself known, which connects the attachment to the frame and enables a predetermined orientation of the attachment to be maintained irrespective of the position in which the arm is located.

In general, the actuators 21, 22 move according to the commands imparted by the operator via means such as joysticks or the like, present in the cab 122, or also remote controls, etc. . . . ; more precisely, the operator acts on these control means, causing the transmission of suitable signals to the distributor 3, which actuates the hydraulic cylinders 21, 22.

Below it will be explained how the invention envisages modifying the way in which the arm 2 responds to the commands imparted by the operator based on the working conditions, with particular reference to how the two frames 11, 12 are arranged relative to each other.

As shown in the appended figures, which illustrate preferred examples of the invention, the front frame 11 can be fitted at the top with a projecting structure 20, for example triangular in shape, where the hinge between the arm 2 and the front frame 11 is defined.

In even greater detail, the arm 2 can be rotoidally coupled to the structure 20 defined between two triangular plates 201, 202 that project upwards from the frame 11, substantially in front of the cab 122.

The plates 201, 202 can for example be formed in a monolithic body with the lower sides of the front frame 11.

In any case, the arm 2 is rotatable about a horizontal or fixed axis relative to the front frame 11 (see FIG. 3); it should be noted that when the expressions "horizontal", "vertical", or other expressions relating to the orientation of the parts of the machine 1 are used in the present description, the case in which the wheels of the machine 1 are resting on horizontal ground is taken as reference.

Figure 3:
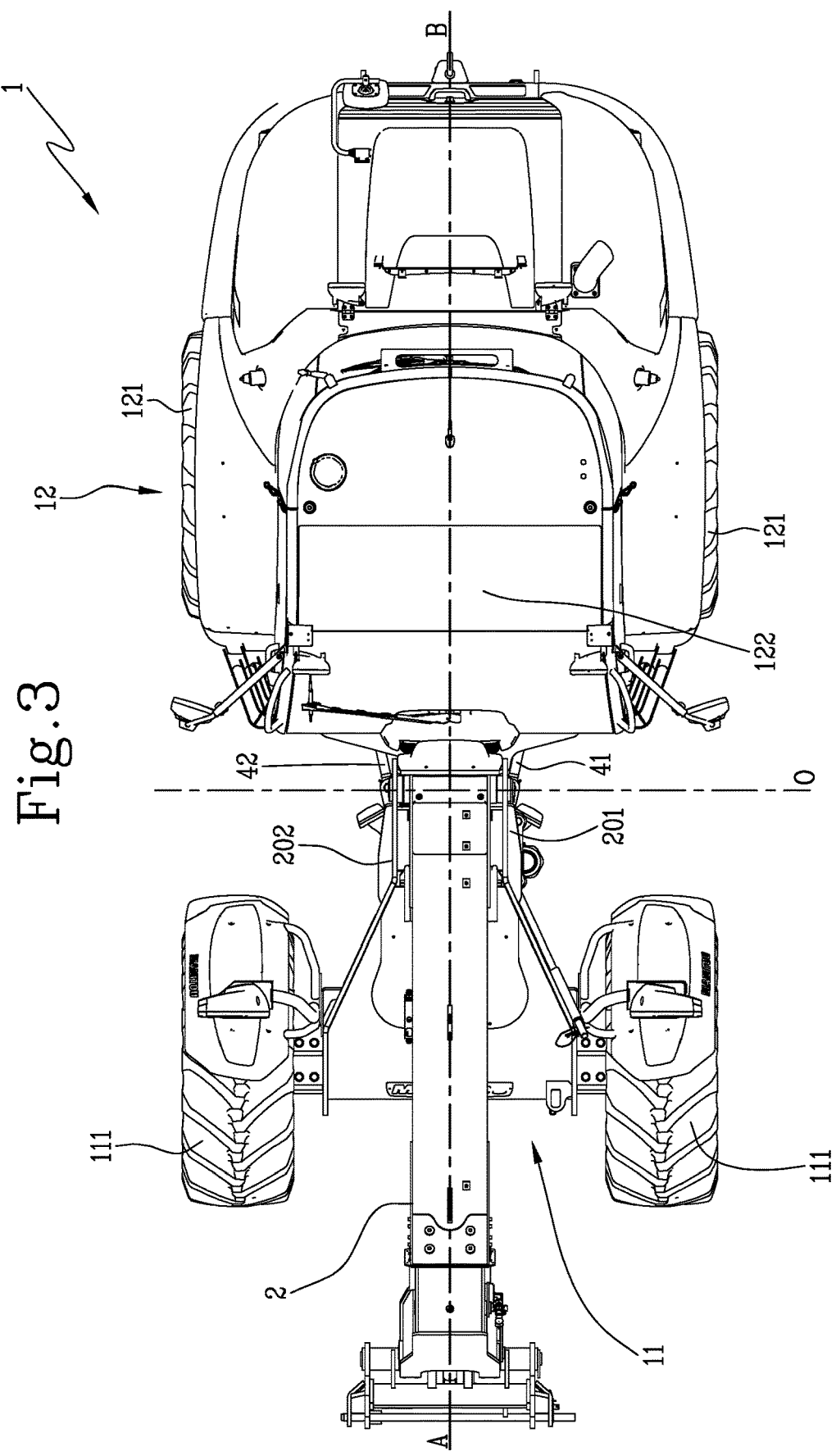
FIG. 3 represents a top view of the proposed machine.
Figure 4:
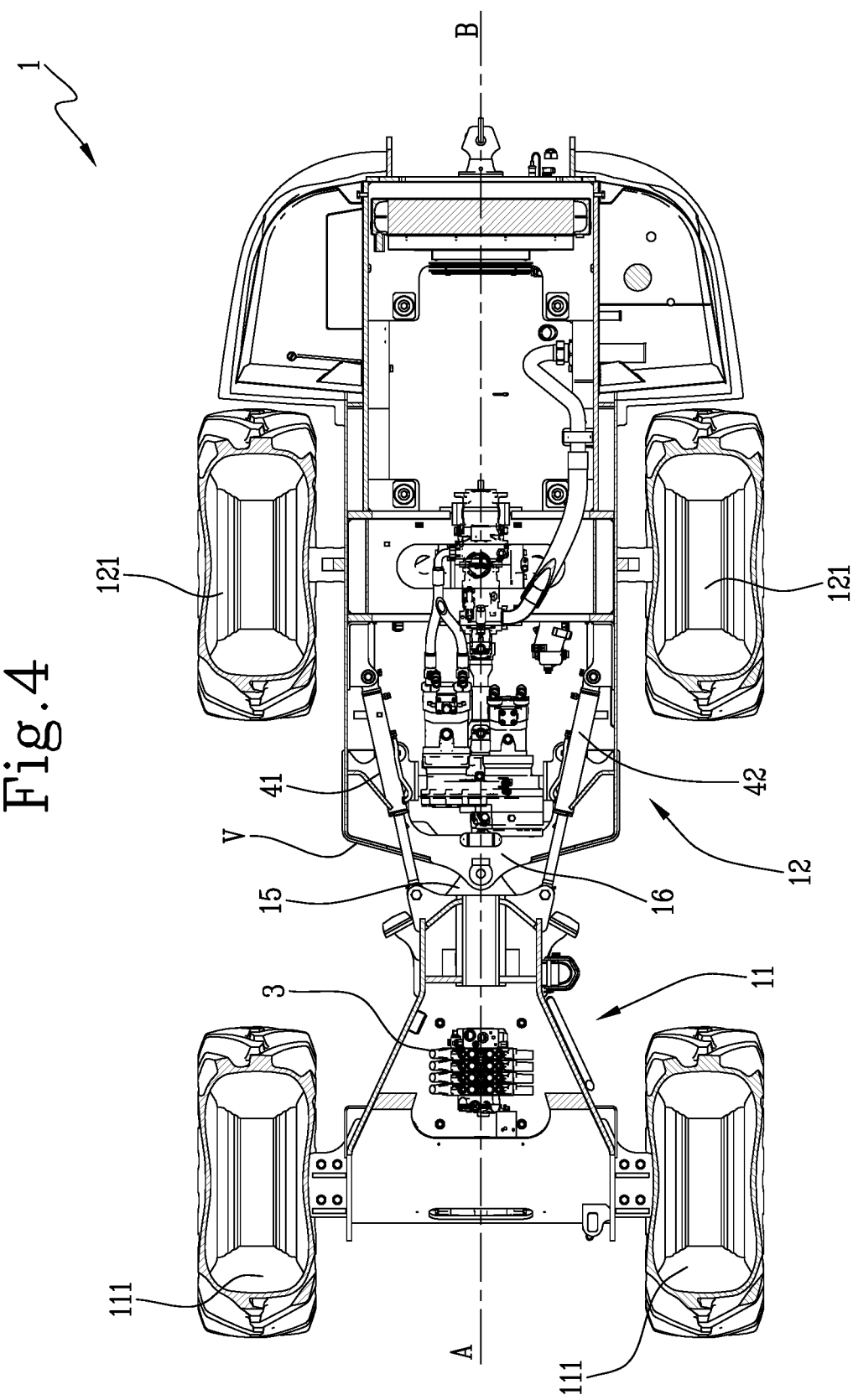
FIG. 4 represents a bottom view of the machine.

In particular, the articulation between the front frame 11 and rear frame 12 is defined around a vertical axis V (see FIG. 4); therefore, the rotation axis O of the arm 2 is perpendicular to the articulation axis V of the frames 11, 12, the latter being perpendicular to the axes A, B of the two frames 11, 12 (see FIGS. 3 and 4).

Furthermore, each frame 11, 12 can be provided with a pair of horizontal flanges 13, 14, 15, 16, each one adapted to partially overlap a different flange 13, 14, 15, 16 of the other frame 11, 12 and to be joined thereto by means of a vertical pivot hinge (see FIGS. 1, 2 and 4); other modes of articulation between the frames 11, 12 are not ruled out.

The articulation between the front frame 11 and the rear one enables steering of the telehandler 1.

In practical terms, the front frame 11 is rotatable with respect to the rear one, i.e. it is inclinable to the right or left, to enable the vehicle 1 to be steered.

As shown in FIG. 4, the inclination of the front frame 11 with respect to the rear one can be produced by using a pair of steering actuators 41, 42, each of which is hinged at opposite ends to the front frame 11 and to the rear frame 12, respectively.

More precisely, the steering actuators can be hydraulic cylinders 41, 42 arranged below the vehicle 1, i.e. on the bottom side of the frames (which is shown in FIG. 4) and controlled by the operator via a joystick, a steering wheel or other control means, located in the cab 122, according to methods in themselves known.

The invention, in general terms, envisages regulating the movement of the lift arm 2 on the basis of the steering angle defined between the two frames 11, 12 of the telehandler 1.

The steering angle can be defined as the angle formed between the central longitudinal axes A, B of the frames 11, 12.

Therefore, if the axis A of the front frame 11 and the axis B of the rear frame 12 are aligned (as in FIGS. 3 and 4) the steering angle will be zero and the telehandler 1 will thus not turn, which prevents the occurrence of a lateral instability.

If there is an unalignment between the axes A, B (as in FIGS. 1 and 2), which corresponds to an inclination between the frames 11, 12 and thus to a turning of the vehicle 1, problems of lateral instability could arise, depending on the size of the angle; the invention enables the movements of the arm 2, in particular the descent velocity and/or the opening, i.e. extending, velocity thereof, to be adapted to the degree of inclination between the frames 11, 12.

Furthermore, the movements of the arm 2 can also be regulated according to the weight and position of the load, which are associated with a further parameter which influences the lateral stability of the vehicle 1.

Consequently, as will emerge more clearly from the following description of particular embodiments of the machine 1 proposed, the invention enables the productivity limits of the prior art to be overcome by providing an articulated telehandler 1 allowing a flexibility in the behaviour of the arm 2 which is not allowed by the products currently present on the market.

The telehandler 1 of the invention comprises both detection means 51, 53, 54 for detecting an angular parameter relative to the aforesaid steering angle, and electronic processing means 6, connected to the detection means 51, 52, 53 and configured to control the operation of the movement actuators 21, 22 of the arm 2, on the basis of the angular parameter detected.

The processing means consist of, or in any case comprise, an electronic processing unit 6 which, in the present description, will be presented as divided into distinct functional modules for the sole purpose of describing the functions thereof in a clear and complete manner.

In practical terms, the processing unit 6 can consist of a single electronic device, which may also be of the type commonly present on this type of machine, appropriately programmed to carry out the functions described; the different modules can correspond to hardware entities and/or routine software belonging to the programmed device.

Alternatively, or additionally, these functions can be performed by a plurality of electronic devices over which the above-mentioned functional modules can be distributed.

In general, the processing unit 6 can rely on one or more microprocessors or microcontrollers to execute the instructions contained in the memory modules and, furthermore, the aforesaid functional modules can be distributed over a plurality of local or remote computers based on the architecture of the network they reside in.

In addition to the detection means 51, 53, 54 for detecting the angular parameter, of which particular examples will be illustrated below, the invention can comprise the use of means 52 for detecting a load parameter which is a function of both the weight of a load borne by the arm 2 and the position of the load with respect to the frame 11 of the machine 1, i.e. the angle formed between the arm 2 and the front frame 11 and how far the arm 2 itself is extended.

We shall note that in order to obtain a calculation of these parameters, it is not necessary to use a device for measuring the extension of the arm 2 or a sensor that measures the angle formed by the arm 2, it being possible, as will become clear below, to detect a single parameter that also takes into account these parameters in addition to the weight.

However, an embodiment of the invention in which measurements of the extension and angle of the arm are performed directly by dedicated devices connected to the processing unit is not ruled out in principle.

In any case, the aforesaid processing means 6 are configured to control the operation of the movement actuator or actuators 21, 22 of the arm 2, also on the basis of the load parameter.

More precisely, the invention can envisage controlling or managing the operation of the movement actuators of the arm as a function of a load diagram that varies according to the angular parameter.

The load diagram, which is an instrument that is in itself known, establishes which movements the arm 2 can carry out in order to move the load safely, depending on the starting position and weight of the load itself. As is well known, the load diagram is specific for a certain work machine and can vary based on its size and structural features.

Therefore, based on the weight of the load borne, the inclination of the arm 2 with respect to the front frame 11 (or in any case an ideal horizontal plane passing through the hinge axis) and how far it is extended (i.e. the distance between the load and the frame 11), the processing unit can enable or inhibit certain movements; for example, in conditions of a potential risk of instability, it can inhibit or slow down aggravating movements, such as the descent of the arm 2 or a greater extension thereof, and allow only "disaggravating" ones.

In the telehandler 1 of the invention, the load diagram is not constant, but rather variable, which means that, the weight and linear and angular position of the load with respect to the frame being equal, the operation of the movement actuators 21, 22 of the arm 2 can vary as a function of the angular parameter, i.e. of how the two frames 11, 12 are inclined.

In practical terms, the processing unit 6 produces command signals which are a function of the angular parameter and load parameter detected and are adapted to control the movement of the arm 2 accordingly, for example by adjusting the descent velocity and/or enabling/inhibiting the descent movements of the arm 2 and the movements of extension thereof in length. The distributor 3 is adapted to receive the command signals and to regulate the operation of the actuators 21, 22 of the arm accordingly 2.

Illustrated below are some possible modes of detection of the angular and load parameters, which are not mutually alternative and do not exhaust the embodiments of the invention.

According to the example in FIG. 1, the angle detection means comprise an angle measuring sensor 51, for example a potentiometer or another digital or analogue sensor suited to the purpose, located in the position of the articulation hinge between the front frame 11 and the rear frame 12.

FIG. 1 shows a particular case in which the sensor 51 is mounted on one of the aforesaid flanges 13 and measures the movement thereof with respect to the flange 14 of the other frame, to which it is joined by means of the common hinge pin; the sensor 51 preferably takes the condition of alignment discussed previously as a reference.

According to a further mode of detecting the steering angle, the detection means include at least one position sensor (not illustrated), connected to one or both of the steering actuators 41, 42 and capable of measuring the extension or shortening of the respective actuator 41, 42.

The angular parameter mentioned several times above can be determined on the basis of the position of the steering actuators 41, 42, i.e. the degree of extension thereof.

However they are configured, the angle detection means 51, 53, 54 comprise one or more sensors adapted to produce angle signals that are a function of the measurements performed by the sensor(s); the signals are received by the processing unit 6.

The machine 1 of the invention can further include a stress sensor 52, 53, 54, for example a strain gauge, located on the front frame 11 and adapted to measure a dimensional deformation, producing a deformation signal that is a function of the measurements performed, which is then received by the processing unit 6.

In the example in FIG. 1, the sensor 52 is located in the "triangle-shaped" structure 20 to which the arm 2 is hinged, and which was spoken of previously.

It should be noted that the value of the deformation measured by the sensor 52 can be considered as a parameter relative also, but not only, to the weight of the load borne by the attachment.

More in general, the deformation sensor or sensors calculate a torque that is a function both of the weight of the load and the polar or relative position thereof, i.e. it is a function of the distance of the load from the front frame 11 of the machine 1 (for example from the hinge of the arm 2), which depends on the extension of the arm 2, and its angular position with respect to the front frame 11, without it being necessary to measure them directly.

In this manner, the activation of the actuators 21, 22 of the arm 2 is made subordinate to the value of a load parameter which takes into account both the weight and relative distance of the load.

Figure 2:
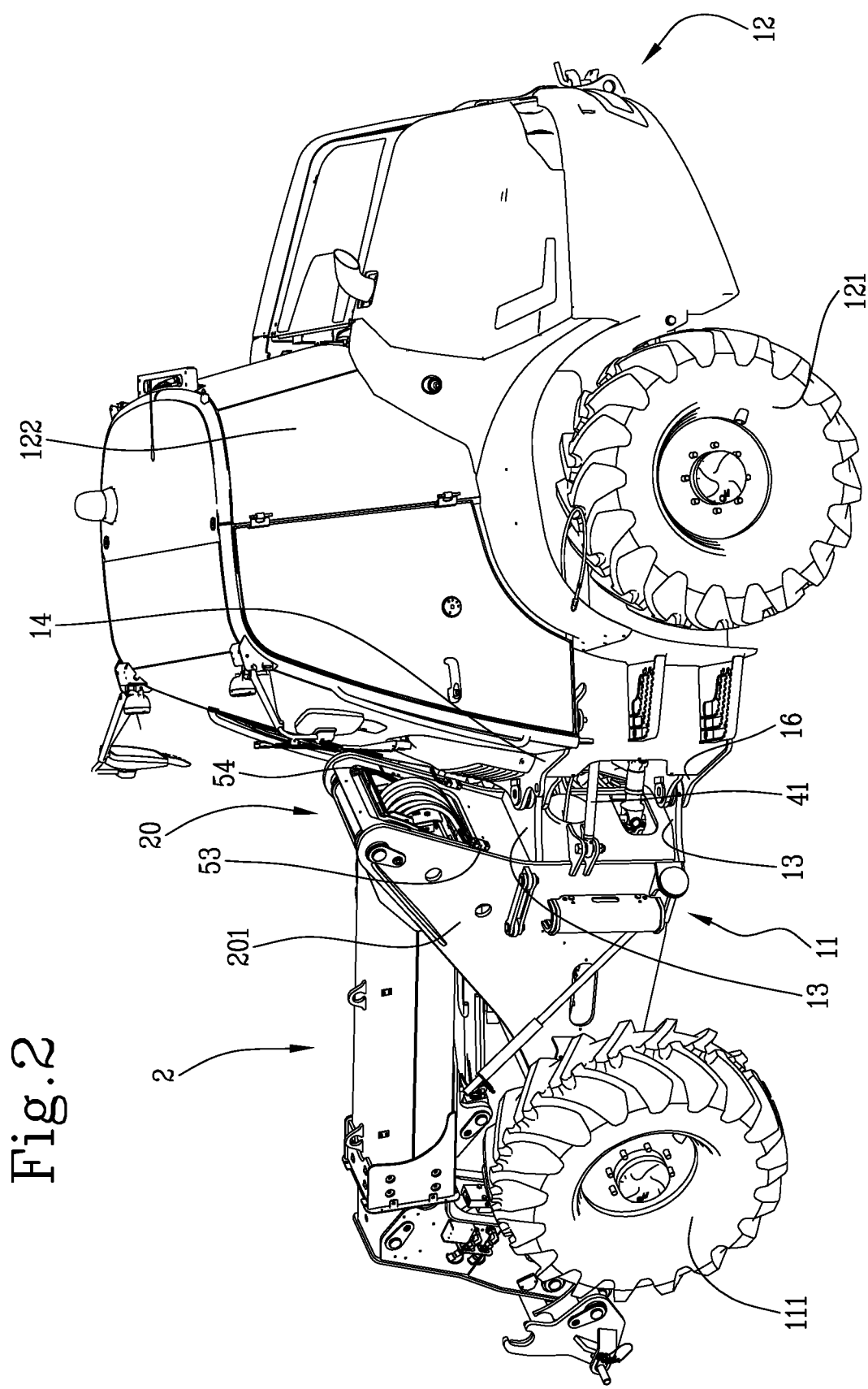
FIG. 2 represents an axonometric view of the machine of the invention, according to a second particular embodiment.

According to the example in FIG. 2, the invention includes two or more stress sensors 53, 54, located in points distanced from each other on the front frame 11, for example in two points of the triangle-shaped structure 20, in which case they are preferably positioned symmetrically in a middle vertical plane of the front frame 11.

In this case, one of the sensors 53 can be closer to the right side of the front frame 11 and the other sensor 54 closer to the left side; for example, one sensor can be located on or near the right triangular plate 202 and the other on or near the left plate 201.

The deformation signals of the sensors 53, 54 can be used to derive the angular parameter relative to the reciprocal position between the two frames 11, 12, since from the difference of the deformations that the right sensor 54 and the left one 53 undergo, it is possible to infer by how much the front frame 11 is inclined with respect to the rear one.

In this case, the processing unit 6 can comprise an inclination module configured to carry out a comparison between the deformation signals produced by the two stress sensors; for example, the difference between the values of the signals of the two sensors can be considered a parameter relative to the steering angle.

If two lateral deformation sensors 53, 54 are used, the load parameter can be calculated by taking the average of the signals produced by them, or in any case by filtering the same by means of suitable mathematical functions; therefore, the processing unit 6 can comprise a load module adapted to derive the load parameter as a function of the values of the stress signals received from the two sensors 53, 54.

It is not ruled out that the deformation sensor or sensors 52, 53, 54 may be located on the arm 2 or in another position of the proposed machine 1.

In addition or alternatively, in order to determine the load parameter use can also be made of different sensors, for example load cells or sensors of an inertial type or also a further stress gauge, located, for example, also on the attachment or on the arm 2 or on the front frame 11, etc. . . .

Coming back to the operation of the processing means 6, it is envisaged that, preferably, they condition the movement of the arm 2 based on whether or not the steering angle and/or the torque bearing on the arm 2, exceed a respective threshold value.

The threshold values of the steering angle and of the torque can be pre-set and in this case be uploaded, for example, into the memory module 60 of the processing unit 6, or else they can be variable and calculated by the processing unit 6 itself, on the basis of the working conditions, as will be better explained in a paragraph below.

In any case, on the basis of the load parameters acquired via the sensors described above, the processing unit 6 verifies whether the steering angle exceeds a certain threshold value and produces, accordingly, command signals adapted to condition the operation of the aforesaid actuators 21, 22 in such a way as to control the movement of the arm 2.

In other words, the processing means 6 are configured to receive the angular parameter and optionally the load parameter from the sensor(s) 51, 52, 53, 54 and to verify whether or not the telehandler 1 is in a condition of reduced lateral stability, and it establishes the operating mode of the lift arm 2 accordingly.

Based on the operating mode, constraints may be placed on or removed from the movement of the arm 2 controlled by the operator.

In particular, the processing unit can be configured to vary the load diagram based on whether the size of the steering angle is greater than one or more threshold values, thereby determining whether the operation of one or more actuators 21, 22 of the arm is completely enabled or limited to only one actuation mode.

In detail, given a certain size of the steering angle, the load diagram applied can be such that, with a certain torque detected on the arm 2, the hydraulic cylinder 21 for swiveling the arm 2 can only be made to push, in order to raise the arm 2 and the extension cylinder 22 can only be made to retract, in order to bring about a decrease in extension.

Alternatively, in the same condition in terms of angle size and torque, the processing unit can also enable the hydraulic cylinder 21 for swiveling the arm 2 to shorten the latter, albeit in a slowed manner, to ensure a descent of the arm 2 that does not produce instability, and the extension cylinder 22 can be made to perform a slowed extension, in order to bring about an increase in the extension, without however causing instability.

The load diagram can vary in a discrete manner, and in this case the processing unit 6 can be set with a plurality of angular thresholds, uploaded into the memory module 60, or else there can be a continuous variation of the load diagram, and in this case the processing unit 6 does not verify whether angular thresholds have been exceeded, or it only verifies the exceeding of a trigger threshold, beyond which the load diagram becomes a function of the size of the steering angle.

The processing unit 6 can thus comprise a selection module configured to choose the load diagram according to the value of the angular parameter.

In even greater detail, the selection module can be configured to change the load diagram if the angular parameter passes a threshold value, either exceeding it or falling below it.

The processing unit 6 can also comprise an angle adjustment module 61 configured to vary the threshold value of the steering angle as a function of the load parameter.

In practical terms, the invention can envisage that the extent of the space of free manoeuvre of the arm 2, in particular of free descent, will vary in a manner that is inversely proportional to the weight of the load it is carrying by means of the attachment mounted on the lift arm 2 and more in general to the torque mentioned several times above: therefore, the larger the detected torque, the lower the threshold value of the steering angle.

The various operating modes of the processing unit 6 described above can be implemented through different configurations thereof, of which two particular versions are illustrated below.

According to a first version, which is the one shown by way of example in FIG. 5, the processing unit 6 is provided with a limitation module 62 configured to regulate the operation of the actuator or actuators 21, 22, so as to limit the movement velocity of the arm 2, preferably during a descent and/or during an extension.

In this case, the limitation module 62 is activatable and deactivatable based on the value of the angular parameter and optionally of the load parameter.

For example, if, from the value of the angular parameter, the processing unit 6 derives that the steering angle has exceeded a threshold value, the limitation module 62 will be activated, whereas if the angle is equal to or less than the threshold, the limitation module will be deactivated.

Stated in other terms, the processing unit 6 can include an activation module 63 configured to activate the limitation module 62 when the steering angle exceeds a relative threshold value and optionally when the weight of the load exceeds a threshold value.

Conversely, the same activation module 63, or a specific deactivation module, will deactivate the limitation module 62 if the steering angle decreases to the threshold value or falls below it and optionally if the weight of the load is equal to or less than the threshold thereof.

It should be noted, moreover, that the limitation module 62 can be configured to prevent the arm 2 from being lowered at a velocity greater than a limit value and it can optionally also be configured to determine a slowing of the arm 2 during a descent and/or during an extension thereof.

Therefore, in the first version of the processing unit 6, there is a switching between different operating states which determines the operation of the machine 1, and in particular the mode of descent of the arm 2.

In accordance with a second version, the processing means 6 directly determine the velocity by means of appropriate calculations without switching between different states.

In detail, in this second version, the processing unit 6 is provided with a velocity module configured to determine at which velocities the arm 2 can move, as a function of the angular parameter.

More precisely, the velocity module can be configured to regulate the operation of the aforesaid first actuators 21, 22 so as to limit the descent velocity and/or the extending velocity of the arm 2, when the angular parameter exceeds a threshold value.

Furthermore, the velocity module can be configured to determine the movement velocity of the arm 2, as a function of the load parameter; in particular, the velocity module can regulate the operation of the first actuators 21, 22 so as to limit the descent velocity and/or the extending velocity of the arm 2, when the weight parameter exceeds a threshold value.

A practical operating mode of the telehandler 1 is briefly illustrated below.

The operator in the cab drives the vehicle 1 along a field, reaching a bale of hay that needs to be moved and, for example, loaded on a transport vehicle or deposited on top of other bales already accumulated in a certain destination area.

The bale is picked up with the forks and lifted by the arm 2, and then carried by the vehicle 1 towards the destination area.

Upon the arrival at the point in which the bale must be unloaded, for example on top of two other bales set side by side, the arm 2 is raised further to above the height of the two bales and then lowered so as to deposit the one carried on top of them.

According to a first possible operating mode, if the sensors 51, 53, 54 described above detect that the inclination between the two frames 11, 12 is excessive, which could lead to a possible lateral instability, the arm 2 will be made to descend slowly, i.e. a constraint is applied on its descent velocity.

In practical terms, in the event of a limitation, even if the operator acts on the controls with maximum intensity, for example by pushing the joystick all the way, the arm 2 will not be able to reach the maximum potential velocity, but will rather move at a lower velocity.

If, by contrast, there are no conditions of risk for lateral stability, the operator will be able to lower the bale quickly, also reaching the maximum velocity, wholly to the advantage of working speed.

What was stated in the above example in relation to the control of the descent velocity of the arm also applies for the control of the extension thereof.

According to the other operating mode, if, according to the particular load diagram that the processing unit 6 applies on the basis of the inclination between the two frames 11, 12, there is a risk of reduced stability, the operator will be able only to lift or retract the arm 2, that is, go towards "disaggravating" load positions.

If, on the other hand, the inclination between the frames 11, 12 is modest, the load diagram applied by the processing unit will be less limiting and, the weight and relative position of the load being equal, certain movements will be allowed, or will be allowed to a larger extent.

After having deposited the bale, the operator will back up the vehicle 1 or in any case pull back the arm 2 so as to slide out the forks and then lower the arm 2; since there are no loads present on the forks, the processing means 6 will not pose any limits to the descent velocity of the arm 2, again favouring working speed, without compromising safety.

The invention also relates to a method of operating an articulated self-propelled work machine, which can be like the proposed machine 1 described above.

In general terms, the method comprises the following steps:
acquiring an angular parameter relative to a steering angle defined between the front frame 11 of the machine 1, provided with front wheels 111 and to which a lift arm 2, adapted to bear a load, is hinged, and a rear frame 12 of the machine 1, hinged to the front frame 11 and provided with rear wheels 121; and
controlling the movements of said arm 2 as a function of the angular parameter.

In detail, the method envisages that the descent velocity of the arm 2 can be regulated as a function of the angular parameter and it can envisage that a load parameter relative to the weight and relative position of the load borne by the arm 2 is acquired, so as to control the possible movements of the arm 2 also as a function of the load parameter.

In other words, the method envisages controlling the movements of the arm by applying a load diagram selected as a function of the angular parameter detected.

It should be noted that the method of the invention can comprise operating steps which correspond to the different functions performed by the components of the machine 1 proposed and by the processing unit 6.

Finally, the invention also relates to a computer program which, when running on the electronic processing means 6, implements the proposed operating method.

The invention claimed is:

1. An articulated self-propelled work machine (1) comprising:
   a front frame (11), provided with a pair of front wheels (111);
   a lift arm (2), adapted to support a load, hinged to said front frame (11) and mobile with respect thereto by means of at least one actuator (21, 22);
   a rear frame (12), provided with a pair of rear wheels (121) and articulated to said front frame (11);
   at least one detecting means (51, 53, 54) for detecting an angular parameter relative to a steering angle between the front frame (11) and the rear frame (12); and
   electronic processing means (6) configured to control the operation of said at least one actuator (21, 22) on the basis of said angular parameter;
   wherein the processing means (6) is configured to control the operation of the actuator or actuators (21, 22) of the arm (2) in accordance with a load diagram selected as a function of the angular parameter detected.

2. The machine (1) according to claim 1, comprising detecting means (52) for detecting a load parameter which is a function of torque to which the arm (2) is subjected, said processing means (6) being configured to control the operation of said actuator (21, 22) on the basis of said load parameter.

3. The machine (1) according to claim 2, wherein the processing means (6) comprises an electronic processing unit (6) which comprises a limitation module (62) configured to regulate the operation of the actuator or actuators (21, 22) so as to limit the movement velocity of the arm (2); said limitation module (62) being activatable and deactivatable on the basis of said load parameter.

4. The machine according to claim 2, wherein the processing unit (6) is configured to calculate said torque on the basis of the signal produced by a stress sensor (52, 53, 54), and wherein said detecting means of the load parameter comprises the stress sensor (52).

5. The machine (1) according to claim 1, wherein said at least one actuator (21, 22) comprises one or more first actuators (21); and wherein said arm (2) can be raised and lowered with respect to the front frame (11), by means of said one or more first actuators (21), the operation of which is subjected to the processing means (6).

6. The machine (1) according to claim 5, wherein the processing means (6) comprises an electronic processing unit (6) which comprises a limitation module (62) configured to regulate the operation of the actuator or actuators (21, 22) so as to limit the movement velocity of the arm (2); said limitation module (62) being activatable and deactivatable on the basis of a load parameter, and wherein the limitation module (62) is configured to prevent the arm (2) from lowering and/or extending with a velocity of greater than a limit value.

7. The machine (1) according to claim 5, wherein the processing means (6) comprises an electronic processing unit (6) which comprises a limitation module (62) configured to regulate the operation of the actuator or actuators (21, 22) so as to limit the movement velocity of the arm (2); said limitation module (62) being activatable and deactivatable on the basis of a load parameter, and wherein the limitation module (62) is configured to determine a slowing of the arm (2) during a descent and/or during an extension thereof.

8. The machine (1) according to claim 5, wherein the processing means (6) comprises an electronic processing unit (6) provided with a velocity module configured to determine at which velocities the arm (2) can move, as a function of the angular parameter, and wherein the velocity module is configured to regulate the operation of the first actuator(s) so as to limit the descent velocity and/or the extending velocity of the arm (2), when the angular parameter exceeds a threshold value.

9. The machine (1) according to claim 5, wherein the processing means (6) comprises an electronic processing unit (6) which includes a velocity module configured to determine a movement velocity of the arm (2), as a function of the load parameter, and wherein the velocity module is configured to regulate the operation of the first actuator(s) so as to limit the descent velocity and/or the extension velocity of the arm (2), when the load parameter exceeds a threshold value.

10. The machine (1) according to claim 1, wherein said at least one actuator (21, 22) comprises at least a second actuator (22); and wherein said arm (2) is extensible and retractable by means of said at least a second actuator (22), the operation of which is subjected to the processing means (6).

11. The machine (1) according to claim 1, wherein the processing means (6) comprises an electronic processing unit (6) provided with a limitation module (62) configured to regulate the operation of the actuator or actuators (21, 22), so as to limit a movement velocity of the arm (2); said limitation module (62) being activatable and deactivatable on the basis of said angular parameter.

12. The machine (1) according to claim 11, wherein the processing means (6) comprises said electronic processing unit (6) which comprises said limitation module (62) configured to regulate the operation of the actuator or actuators (21, 22) so as to limit the movement velocity of the arm (2); said limitation module (62) being activatable and deactivatable on the basis of a load parameter, and wherein the limitation module (62) is configured to prevent the arm (2) from lowering and/or extending with a velocity of greater than a limit value, and wherein the processing unit (6) includes an activation module (63) configured to activate the limitation module when the steering angle exceeds a threshold value.

13. The machine (1) according to claim 11, wherein the processing means (6) comprises said electronic processing unit (6) which comprises said limitation module (62) configured to regulate the operation of the actuator or actuators (21, 22) so as to limit the movement velocity of the arm (2); said limitation module (62) being activatable and deactivatable on the basis of a load parameter, and wherein the limitation module (62) is configured to prevent the arm (2) from lowering and/or extending with a velocity of greater than a limit value, and wherein the processing unit (6) includes an activation module (63) configured to activate the limitation module when a weight of said load exceeds a threshold value.

14. The machine (1) according to claim 1, wherein the processing means (6) comprises an electronic processing unit (6) provided with a velocity module configured to determine at which velocities the arm (2) can move, as a function of the angular parameter.

15. The machine (1) according to claim 1, wherein the processing means (6) comprises an electronic processing unit (6) which includes a velocity module configured to determine a movement velocity of the arm (2), as a function of the load parameter.

16. The machine according to claim 1, wherein the processing unit (6) comprises a selection module configured to select said load diagram as a function of the value of the angular parameter.

17. The machine according to claim 16, wherein said selection module is configured to change the load diagram when the angular parameter exceeds a threshold value.

18. The machine (1) according to claim 1, wherein the front frame (11) is rotatable with respect to the rear frame (12) by means of at least a pair of steering actuators (41, 42), each of which is hinged at opposite ends to the front frame (11) and to the rear frame (12), respectively, at least one of said steering actuators (41, 42) being connected to at least a positioning sensor adapted to measure the extension and retraction of the respective steering actuator (41, 42) and adapted to produce a signal.

19. The machine (1) according to claim 1, wherein the front frame (11) and the rear frame are articulated by means of a hinge at which at least an angular measuring sensor (51) is arranged, adapted to produce a signal.

20. The machine (1) according to claim 1, wherein said at least one detecting means (51, 53, 54) for detecting an angular parameter comprises at least a stress sensor (52, 53, 54) located at the front frame (11) and adapted to measure a dimensional deformation thereof and to produce a signal.

21. The machine (1) according to claim 20, wherein at least two stress sensors (53, 54) are located at distanced points on the front frame (11).

22. The machine (1) according to claim 21, wherein an inclination module is adapted to carry out a comparison between the signals produced by said at least two stress sensors and thus determine the angular parameter.

23. The machine according to claim 20, wherein the processing unit (6) is configured to calculate a torque on the basis of the signal produced by said at least a stress sensor (52, 53, 54).

24. An operating method of a self-propelled work machine (1) of an articulated type, comprising the following steps:
    acquiring an angular parameter relative to a steering angle defined between a front frame (11) of the machine (1), provided with front wheels (111) and to which a lift arm (2) is hinged, adapted to bear a load, and a rear frame (12) of the machine (1), hinged to the front frame (11) and provided with rear wheels (121); and
    controlling movements of said arm (2) as a function of said angular parameter; wherein the movements of the arm (2) are controlled by means of a load diagram selected as a function of the angular parameter acquired.

25. The method according to claim 24, wherein the descent velocity and/or the extension velocity of the arm (2) is regulated as a function of the angular parameter.

26. The method according to claim 24, comprising the step of acquiring a load parameter relative to the weight of the load borne by the arm (2), wherein the movements of the arm (2) are controlled as a function of said load parameter.

27. An electronic processing means (6) which is provided with a software program which, when running on said electronic processing means (6), is configured to actuate the method according to claim 24.

28. An articulated self-propelled work machine (1) comprising:
    a front frame (11), provided with a pair of front wheels (111);

a lift arm (2), adapted to support a load, hinged to said front frame (11) and mobile with respect thereto by means of at least one actuator (21, 22);

a rear frame (12), provided with a pair of rear wheels (121) and articulated to said front frame (11);

at least one detecting means (51, 53, 54) for detecting an angular parameter relative to a steering angle between the front frame (11) and the rear frame (12); and electronic processing means (6) configured to control the operation of said at least one actuator (21, 22) on the basis of said angular parameter;

wherein the processing means (6) comprises an electronic processing unit (6) provided with a limitation module (62) configured to regulate the operation of the actuator or actuators (21, 22), so as to adjust the descent velocity of the arm (2), so as to make it lower at a velocity slower than the maximum potential velocity on the basis of said angular parameter.

29. An articulated self-propelled work machine (1) comprising:

a front frame (11), provided with a pair of front wheels (111);

a lift arm (2), adapted to support a load, hinged to said front frame (11) and mobile with respect thereto by means of at least one actuator (21, 22);

a rear frame (12), provided with a pair of rear wheels (121) and articulated to said front frame (11);

at least one detecting means (51, 53, 54) for detecting an angular parameter relative to a steering angle between the front frame (11) and the rear frame (12); and electronic processing means (6) configured to control the operation of said at least one actuator (21, 22) on the basis of said angular parameter;

wherein said arm (2) can be raised and lowered with respect to the front frame (11), by means of one or more first actuators (21), the operation of which is subjected to the processing means (6);

wherein the processing means (6) comprises an electronic processing unit (6) provided with a limitation module (62) configured to regulate the operation of the actuator or actuators (21, 22), so as to limit a movement velocity of the arm (2), so as to make it lower at a velocity slower than the maximum potential velocity on the basis of said angular parameter;

wherein the processing means (6) comprises said electronic processing unit (6) which comprises said limitation module (62) configured to regulate the operation of the actuator or actuators (21, 22) so as to limit the movement velocity of the arm (2); said limitation module (62) being activatable and deactivatable on the basis of said load parameter, and wherein the limitation module (62) is configured to determine a slowing of the arm (2) during a descent and/or during an extension thereof.

30. An articulated self-propelled work machine (1) comprising:

a front frame (11), provided with a pair of front wheels (111);

a lift arm (2), adapted to support a load, hinged to said front frame (11) and mobile with respect thereto by means of at least one actuator (21, 22);

a rear frame (12), provided with a pair of rear wheels (121) and articulated to said front frame (11);

at least one detecting means (51, 53, 54) for detecting an angular parameter relative to a steering angle between the front frame (11) and the rear frame (12); and electronic processing means (6) configured to control the operation of said at least one actuator (21, 22) on the basis of said angular parameter;

wherein at least a stress sensor (52, 53, 54) is located at the front frame (11) and is adapted to measure a dimensional deformation thereof and to produce a signal; wherein the at least one detecting means (51, 53, 54) for detecting an angular parameter comprises at least two stress sensors (53, 54) located at distanced points on the front frame (11); and wherein an inclination module is adapted to carry out a comparison between the signals produced by said at least two stress sensors and thus determine the angular parameter.

* * * * *